F. O. WOODLAND.
LABELING MACHINE.
APPLICATION FILED NOV. 4, 1908.

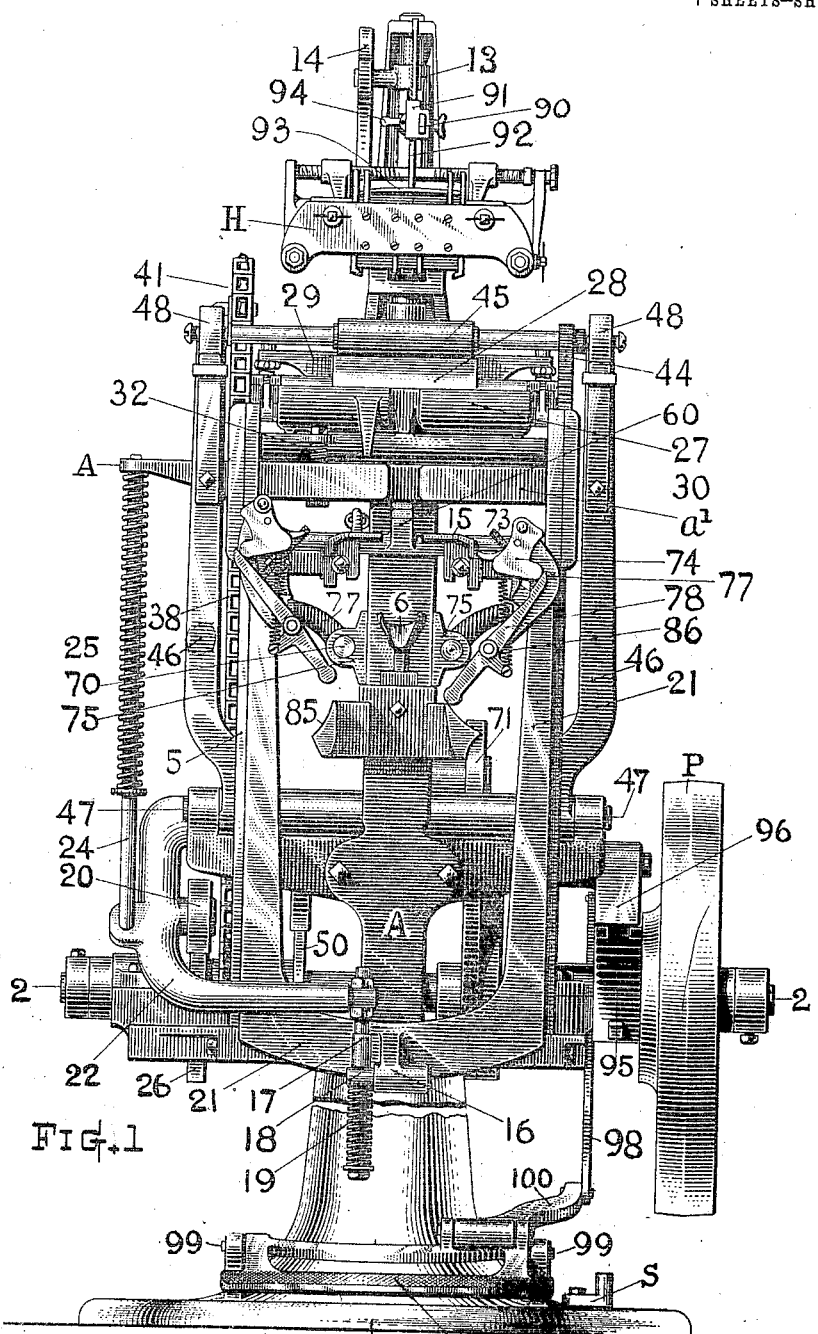

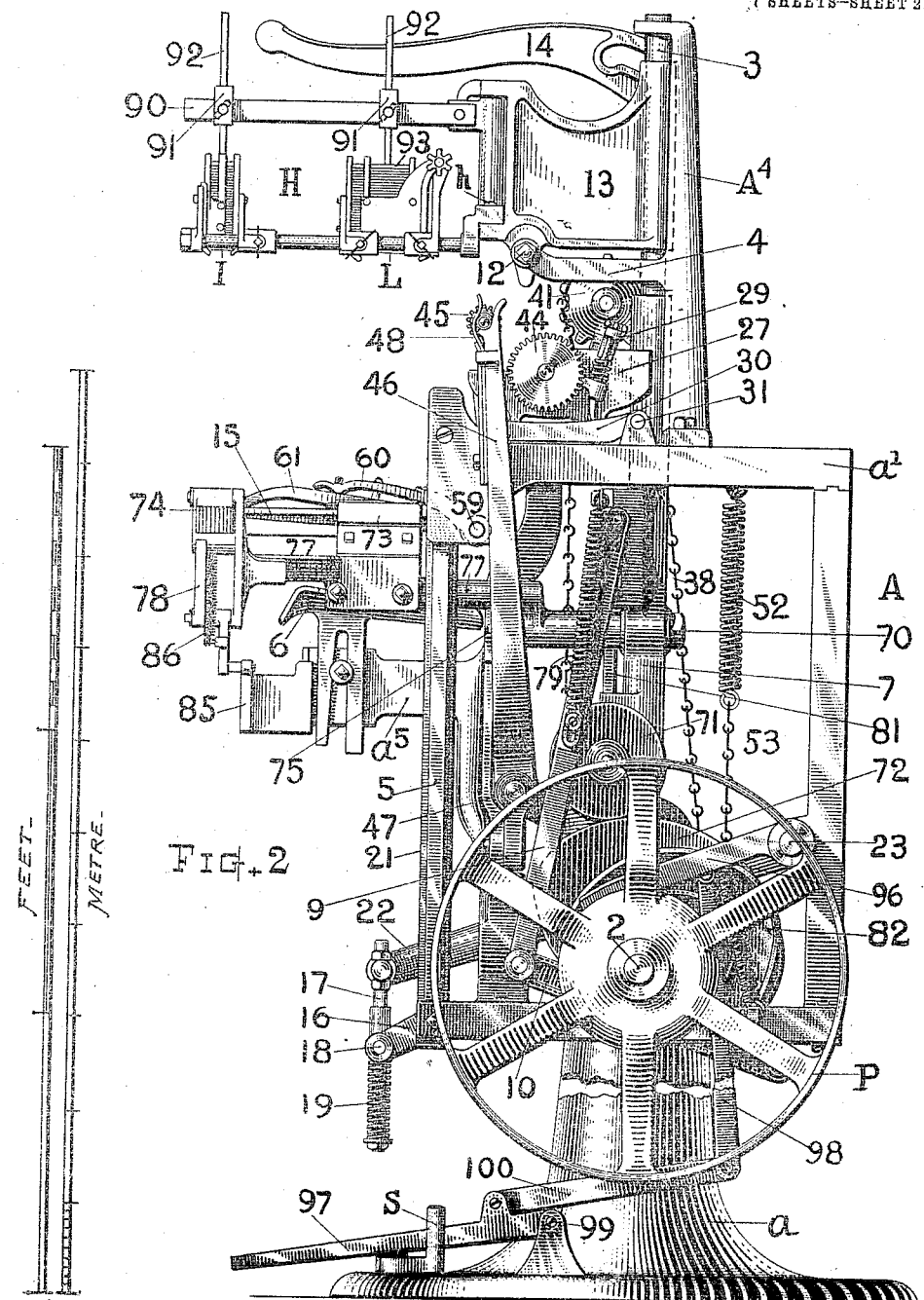

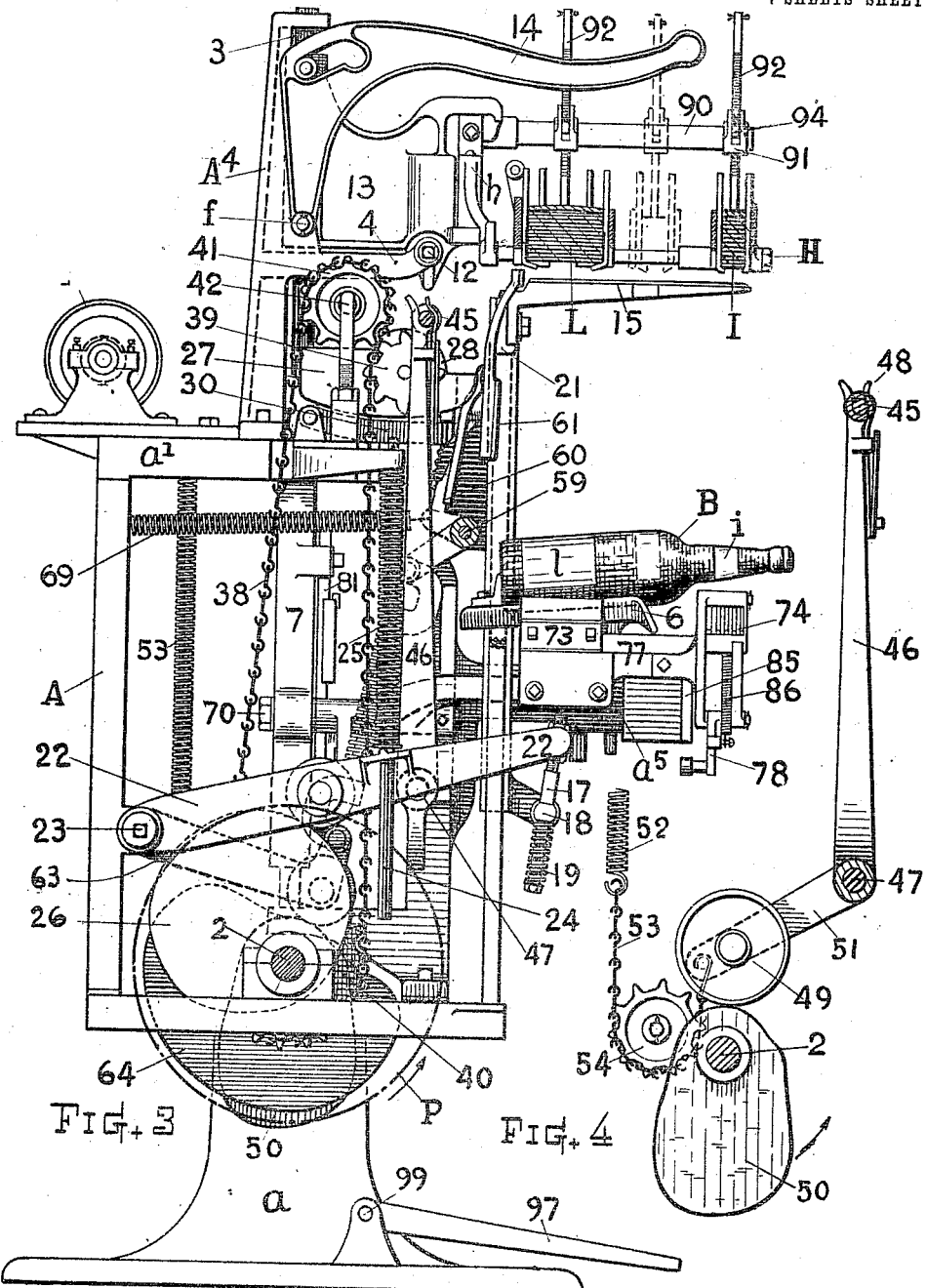

998,664.

Patented July 25, 1911.
7 SHEETS—SHEET 4.

Witnesses
Ella P. Blenus
Geo. M. Rice

Inventor
Frank O. Woodland
By Chas. H. Burleigh
Attorney

F. O. WOODLAND.
LABELING MACHINE.
APPLICATION FILED NOV. 4, 1908.
998,664.
Patented July 25, 1911.
7 SHEETS—SHEET 5.
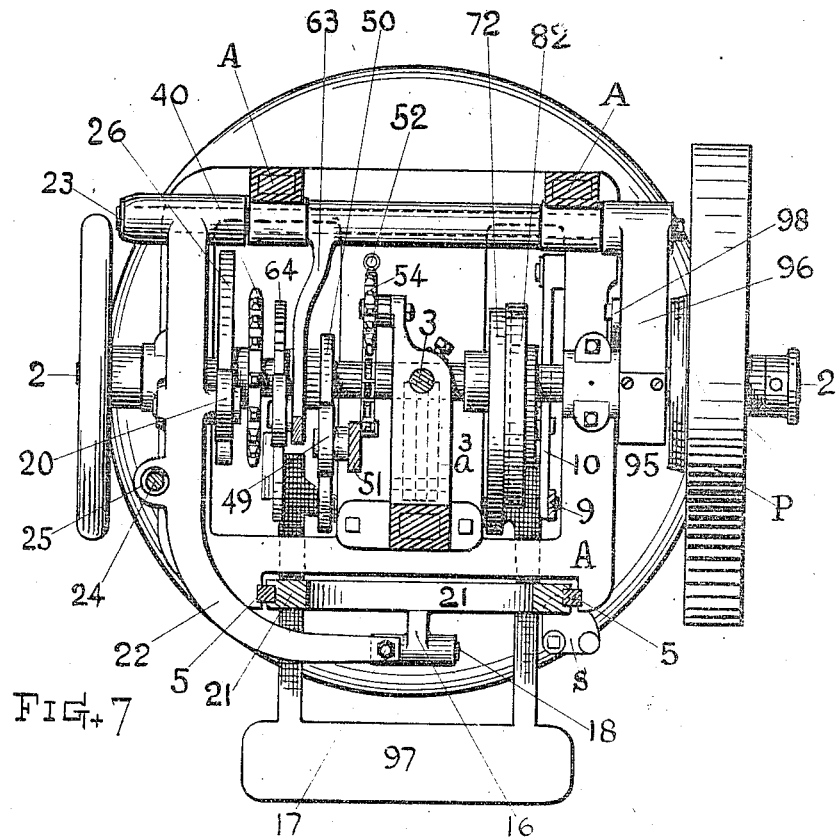
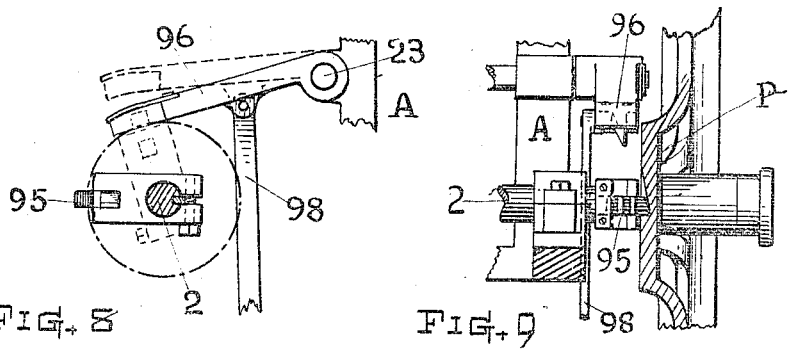
Witnesses
Ella P. Blenus
Geo. M. Rice
Inventor
Frank O. Woodland
By Chas. H. Burleigh
Attorney.

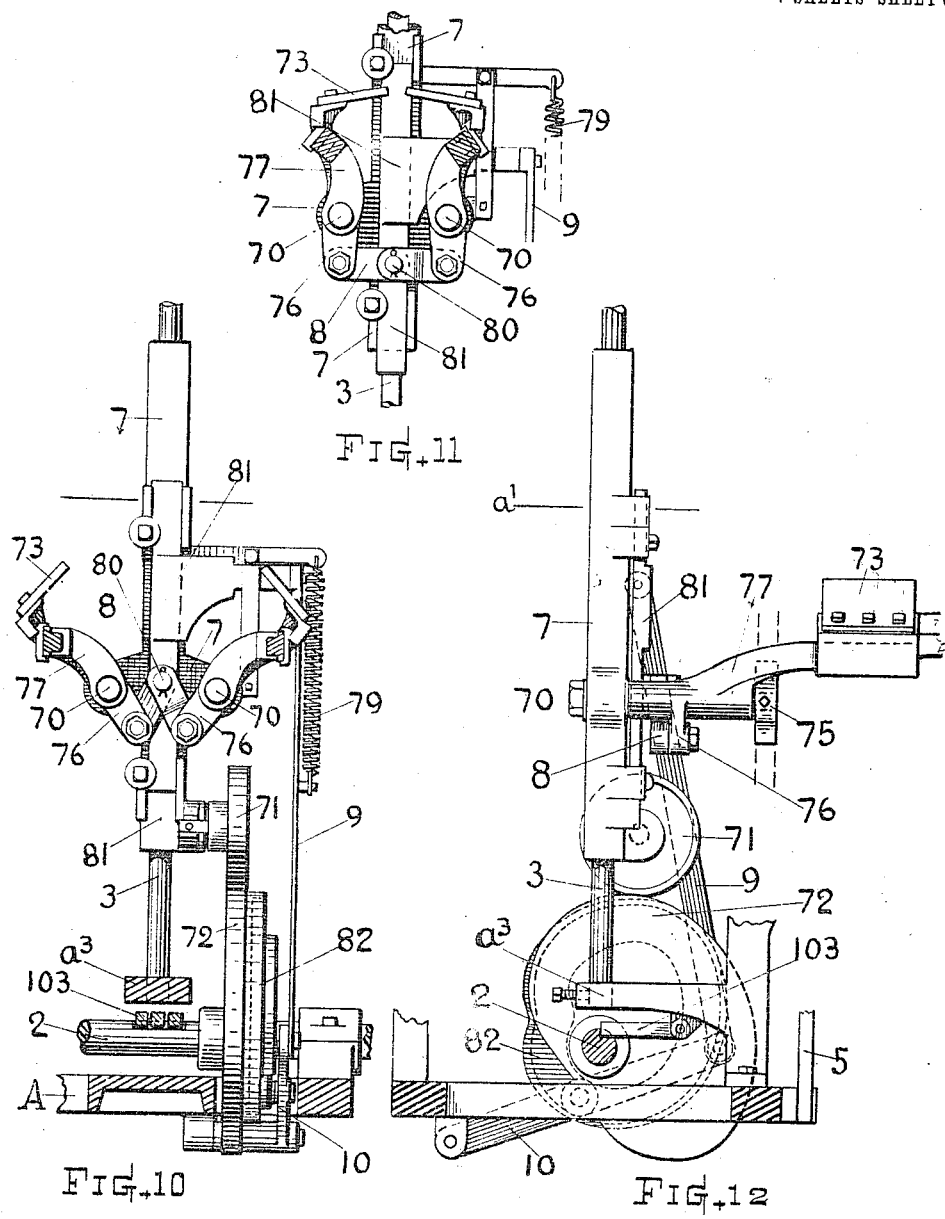

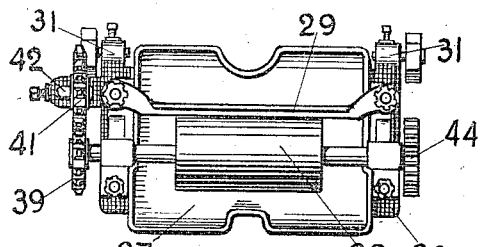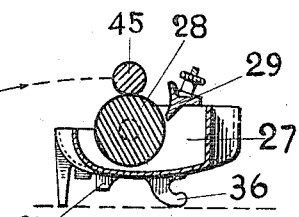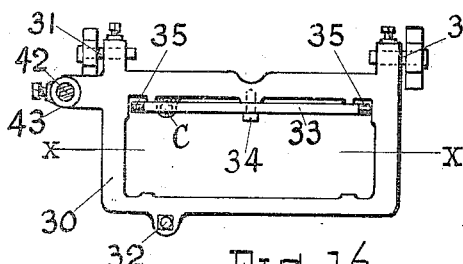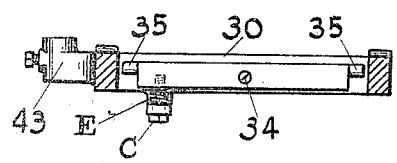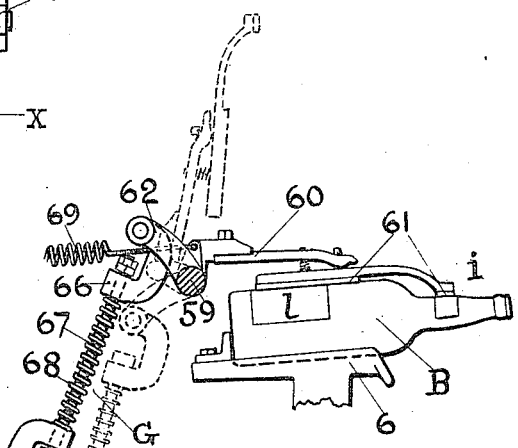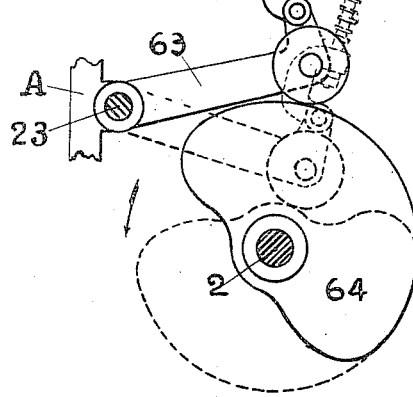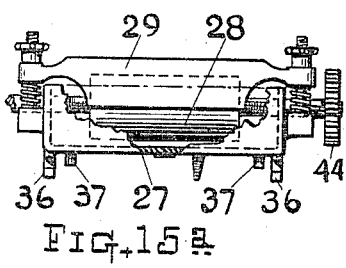

UNITED STATES PATENT OFFICE.

FRANK O. WOODLAND, OF WORCESTER, MASSACHUSETTS.

LABELING-MACHINE.

998,664.

Specification of Letters Patent. Patented July 25, 1911.

Application filed November 4, 1908. Serial No. 461,028.

*To all whom it may concern:*

Be it known that I, FRANK O. WOODLAND, a citizen of the United States, residing at Worcester, in the county of Worcester and State of Massachusetts, have invented a new and useful Improvement in Labeling-Machines, of which the following is a specification, reference being made therein to the accompanying drawings.

This invention relates to the improved construction and combination of parts in a machine for affixing labels to bottles or similar articles, as hereinafter explained; the object being to provide a machine so organized that it will be convenient for operation, durable and rapid in its action, and capably efficient for dual labeling, or the simultaneous affixment of a plurality of separate labels upon the body and neck of a bottle, at one operation of the machine.

Another object is to provide in a labeling machine, means for effecting a yielding and resilient action of the picker mechanism in its contact with the label-holder pack, or packs, when taking labels therefrom.

Another object is to afford a simple and efficient mechanism for effecting the rocking movement of the wiper-arms, and for locking said arms in proper relation during the wiping operation.

Another object is to provide an adjustable supporter or seating-cradle for the glue-box or supply-reservoir, to render said glue-box conveniently removable, and adapted for regulating the glue-supply devices in respect to the transferring roller.

Minor objects and features of my invention are set forth and more fully explained in detail in the following description of the illustrated mechanism; the particular subject matter claimed being hereinafter definitely specified and set forth in the summary.

The drawings represent a bottle labeling machine embodying the claimed invention.

Figure 5:
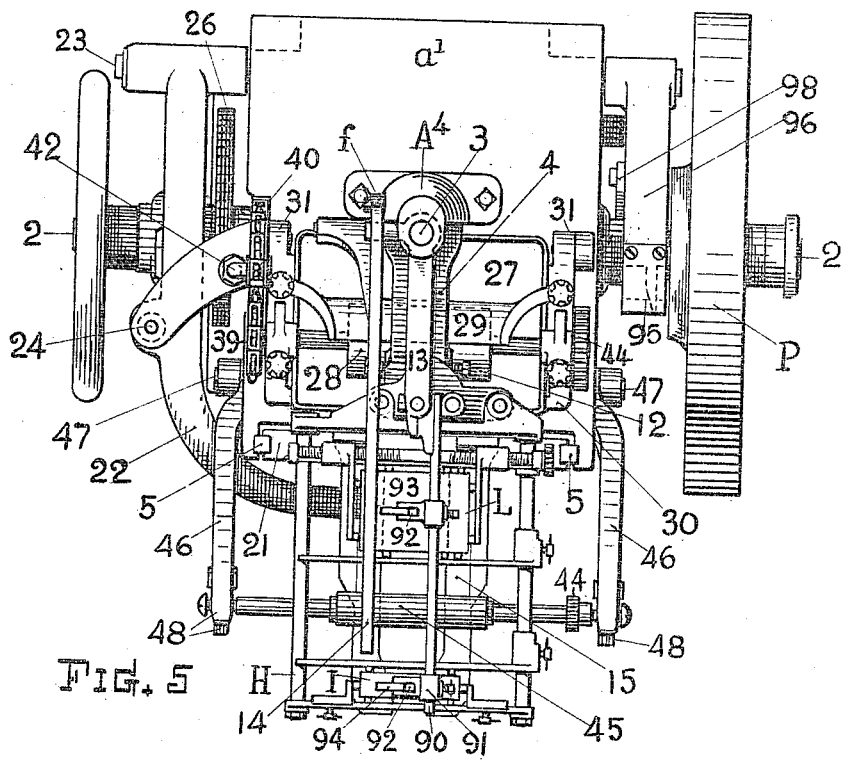
Figure 6:
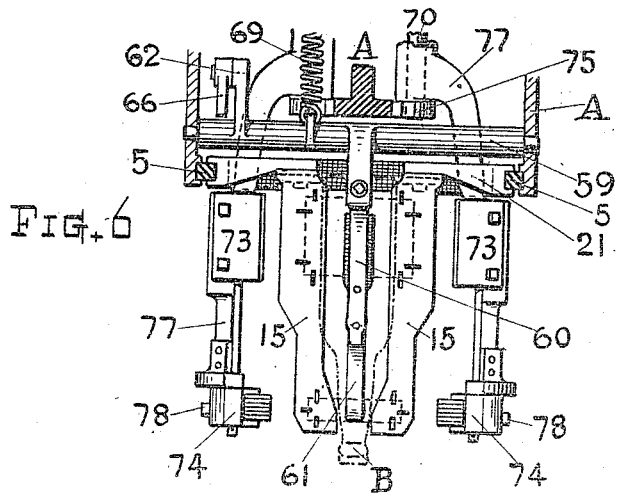

Figure 1 is a front view; Fig. 2 a right side view; Fig. 3 a left side view; some portions being in section. Fig. 4 is a detail of the transfer-roller actuating devices; Fig. 5 a top plan view; Fig. 6 a plan of the pickers, wipers and grip-devices; Fig. 7 a sectional plan view of the lower portions of the machine. Figs. 8 and 9 are fragmentary detail views of the power-clutch. Fig. 10 is a front view of the wiper action, the wipers being in open position, and Fig. 11 a front view of the wipers in locked or closed position. Fig. 12 is a side view of the wiper action. Fig. 13 is a separate side view of the grip mechanism with dotted lines illustrating the action thereof. Fig. 14 is a plan view of the glue-box or reservoir in detail; Fig. 15 a central vertical section of the glue-box and glue-delivering roll. Fig. 15$^a$ is a rear view of the same; a portion of the box broken out to reveal the scraper and roll. Fig. 16 is a plan view of the seating-cradle for supporting and adjusting the glue-box, and Fig. 17 is a vertical section of the same at line X X.

Referring to the drawings, A denotes the main frame comprising a generally rectangular body supported upon a suitable standing-foot, pedestal or circular base $a$, and having a table-formed top $a^1$ upon which an electric motor M may be mounted for driving the machine. The power shaft 2 is arranged in bearings at the lower part of the body-frame, and provided with a series of cams for actuating the working parts.

An upright guide rod 3 is arranged at central position in the frame, its lower end supported in a fixed bearing $a^3$ near the shaft 2, and secured by a set-screw or other fastener, while its upper part is held firm by a brace standard $A^4$ rigidly fixed to the frame. The lower part of the rod 3 serves as a guide for the wiper-carrier 7, while its upper part has the label-holder-bracket or carrier 13 supported thereon. Upright guides 5, for directing the picker carrier 21, are secured, at the upper and lower ends, to the front corners of the frame.

The bottle-rest 6 is secured upon a stationary forwardly projecting bracket or part $a^5$ of the frame in a manner to permit adjustment of the rest up or down to accommodate different sized bottles. The rest is best set with its rear end somewhat lower than its front end, and an adjustable gage provided for regulating the position of the bottle thereon. The position of the bottle is shown at B, Fig. 3, and indicated by dotted lines on Fig. 6.

The label-supply holder H is arranged above the bottle-rest, detachably secured by interlocking pins and sockets $h$ to its supporting carrier 13; so that label-holders can be readily interchanged. This label-holder provides a plurality of label compartments; as for body-labels L and neck-labels I. Its parts may be constructed and arranged as shown, (see Figs. 1, 2, 3 and 5) or in other approved manner. The peculiar structure of this label-holder has been made the subject matter of a separate application for Letters Patent.

The label-holder carrier or bracket 13 is mounted upon the rod 3, and is slidable for a limited distance thereon; and a lever 14, fulcrumed upon the frame at $f$ and having a conveniently projecting handle, and a cam-slot or means of connection with the label-holder carrier, is provided, whereby the carrier and label-holder can be readily moved a short distance away from the picker-action, thereby temporarily stopping the feeding of labels while other parts of the machine are performing their regular actions. The carrier 13 is provided with a bearing member having parallel lateral faces; and which is disposed between the ends of a bifurcated arm 4, attached to and projecting forward from the standing backbrace, or some suitable support, whereby the carrier and label-holder are confined against lateral displacement while permitted such vertical movement as is imparted by the lever. Set-screws 12 threaded into the ends of the arm and impinging against the opposite faces of the carrier, afford a means for adjusting the carrier and label-holder to the central plane or position.

The pickers, or glue-applying plates 15, are detachably secured to the inwardly offset upper ends of the picker-carrier. Said picker-plates stand in horizontal relation below and directly in line with the label-holder. Various forms of pickers may be interchangeably used to conform to the requirements of different shapes of labels.

The picker-carrier 21 is an approximately rectangular frame having grooved edges that slide up and down the guides 5, reciprocating movement being imparted to said carrier by a swinging lever 22 fulcrumed on an axis 23 at the rear part of the frame A, and extending forward with a laterally curved fore-end offset, substantially as shown. (See Figs. 1, 3 and 7.) The offset fore-end of said lever is connected with an ear 16 fixed on the picker-carrier; the connection being preferably composed of a link-bar 17 attached to the end of the lever, and passing through a wrist pivot 18 fitted in the ear. An expanding-coil spring 19 is arranged upon said link-bar below the wrist-pivot, so as to afford a yielding pressure as the pickers are elevated against the labels. A roller 20 mounted on a stud fixed in the lever 22, runs upon a cam 26 carried by the shaft 2, whereby said lever and the picker-carrier are operated.

Combined with the frame and picker-carrier lever, I provide a rod 24 with a spring 25 thereon, which latter is compressed when the pickers are elevated; said spring serving as a resilient cushion for the upward momentum of the parts, and also to start the pickers away from the label-holder when the label is taken from the pack.

The spring 19 prevents shock and too great a pressure of the pickers against the label-holder, and affords a degree of elasticity and ease in the operation of the mechanism.

27 indicates the glue-box or reservoir for the supply of glue, or other adhesive substance, and 28 the glue-delivering roll mounted therein. Said glue-box is arranged as shown, and is removably supported upon an adjusting member or seating-cradle 30, that is hinged at its rear corners 31 to the main frame. A screw 32 (see Figs. 1 and 16) is provided for adjusting its front edge up or down. A bar 33 is pivoted within the cradle at 34 and its ends 35 are fitted to engage with recessed lugs 36 formed on the bottom of the glue-box; which latter also has lugs 37 that are fitted to engage behind the front lip of the cradle for retaining the glue-box in place thereon without other fastenings; so that the box can be lifted off and replaced at will. A screw C is provided for adjustment of the bar 33. Said screw extends through an ear formed on the cradle and is threaded into the bar, and has a spring E between the lug and bar. By the means shown the position of the glue-box can be regulated so that the delivering roll 28 will accurately coact with the glue-transferring roller 45. The glue-delivering roll 28 is rotated by a chain 38 that runs over a sprocket-wheel 40 on shaft 2, and an idler 41, and engages with a sprocket-wheel 39 on the axle of said glue-delivering roll. The idler sprocket is mounted upon a stud 42 that is adjustably supported in an ear 43 at the end of the cradle, as best shown on Fig. 3. An adjustably arranged scraper 29 regulates the amount of glue delivered by the face of the delivering roll to the transferring roller.

The transferring roller 45, for spreading the glue or adhesive substance upon the top surface of the picker-plates, is carried by a pair of upwardly projecting oscillating arms 46 connected and pivoted at their lower end on an axis 47, and having spring bearing-jaws 48 at their upper ends within which the journals of the transfer roller are removably mounted. The arms 46 swing forward and backward to carry the transferring roller to and from the glue-delivering roll, and across the faces of the pickers for depositing a film of glue thereon. Said arms are operated by a cam 50 on the shaft 2, acting against a roller-stud 49 carried on a projecting member 51 joined with arms. A pull spring 52 is suitably connected to said member, in the present instance by a chain 53 passing about a sprocket or sheave 54 in a manner to act in opposition to the cam movement. (See Fig. 4.) Gears 44 are arranged for rotating the roller 45 when in contact with the delivering roll. The roller 45 passes across the face of the pickers as the latter move upward.

The grip-device 60 is mounted on a rocker-bar or cross shaft 59 having a grip attaching lug and an arm 62, and is arranged to swing up beneath the label-holder and to swing down upon the top of the bottle lying on the rest, as shown. Said grip-device consists of a grip-arm carrying a flexibly attached member 61 having faces or means for pressing upon the several labels when presented for affixment; taking them from the pickers and retaining them centrally while being smoothed down by the wipers. The grip-device is operated by a connection G and lever 63 that is actuated by a cam 64 upon the shaft 2. (See Fig. 12.) The connection G comprises the coupling-heads 65 and 66 which are respectively pivoted to the arm 62 and lever 63 and united by a rod 67 that is slidable in one or both of the heads, and confined from escaping therefrom by a nut or boss at each end of the rod. A coiled wire push-spring 68 is arranged upon the rod, its ends pressing against the respective heads with an expansive force sufficient to keep the connection normally extended. Whenever the grip-device is brought down upon the bottle, by the thrust movement of the connection, the spring affords a yielding pressure of the grip upon the label according to the tension of the spring. A pull spring 69 connects a projection on the grip-shaft to a suitable lug on the frame and serves to retract or swing the grip-device to upright position when the cam allows the lever 62 to recede.

The wiper mechanism comprises a vertically reciprocating tubular carrier 7, movable up and down upon the central guide-rod 3, and operated by the cam 72 on the shaft 2. A roller 71 mounted on a stud fixed in the side of the carrier runs on the cam, and the wiper mechanism is elevated directly by the action of the cam and descends by gravity. If desired a spring may be used to assist the downward movement. A pair of horizontal axis-studs 70 are fixed in the carrier and project forward at either side of the central plane at suitable distance apart. Their front ends are provided with bearing shoes 75 that slide against guiding surfaces on the upright parallel edges of the central member of the frame. Laterally rockable right and left wiper-arms 77 are mounted upon the axis-studs 70 and project forward, in the manner shown, for supporting the wipers 73 and 74, which latter may be of any variety or form according to the requirements of the particular kind or shape of labels used; or for single or plural labeling. The hubs of the wiper-arms are each provided with an inwardly projecting crank member or ear 76 that is connected by a short pivotally joined link 8 with a stud 80 fixed in an endwise movable slide 81 mounted in suitable bearings, or guides, upon the wiper-carrier 7, as best shown in Figs. 10, 11 and 12. Said slide is adapted to have reciprocative movement imparted thereto, independently of the carrier movement, by a connection rod 9 and lever 10 actuated by a cam 82 on the shaft 2. A spring 79 is connected with the rod 9 to exert lifting force for partially balancing the weight of the slide. The cams 72 and 82 can be formed in a single piece, comprising both the side-groove cam and the peripheral-surface cam, as shown. The movement of carrier 7 carries the wipers and the slide 81 up and down, and the independent movement of the slide, together with the action of the links 8, effects the opposite rocking movement of the wiper-arms 77 for opening and closing the wipers laterally, as indicated in Figs. 10 and 11. When the wipers are closed in, the links 8 stand in approximately straight alinement with each other, (see Fig. 11) thereby locking the wiper-arms rigid while they move downward for wiping-on the label. The initial independent upward movement of the slide 81 releases the lock and swings the wipers outward as they move upward. (See Fig. 10.) The wipers 74 for neck labels may be of any approved kind. In this instance they are constructed as swinging heads carrying a series of pivoted spring-pressed fingers. Controlling levers 78, actuated by a cam or surface 85 on the frame, serve for pressing forward the wiper-heads to effect an under wiping action, as said wipers pass below the bottle. A spring 86 is provided for retracting the wiper-head when the lever is free from the cam. The special construction of this class of wiper has been embraced in other applications for Letters Patent.

The follower mechanism arranged over the label-holder to resist the lifting action of the pickers when pressed against the bottom of the pack, or packs, of labels, preferably consists of a bar 90 attached to the label-holder-carrier 13 in a manner to be approximately rigid against upward movement. Said bar extends over the label compartments L and I and has mounted thereon, for each of the respective compartments, a guide-device 91 within which is a vertically sliding follower-rod 92, the lower end of which rests upon the top of a follower-plate 93 laid upon the top of the pack of labels. The guide device is provided with a pawl 94 that automatically resists upward movement of the rod while allowing its free downward movement in the guide; so that the followers can descend as the packs of labels diminish. The guides are adjustable along the bar and are severally confined at any position thereon by set-screw or other suitable fastening. Any number of guides and follower-rods can be used upon the bar to correspond with the number of compartments in the label-holder.

The drive-pulley P is mounted to turn loose on the shaft 2, and an automatic stop-clutch 95 serves for connecting the pulley for rotating the shaft. The clutch is controlled by the treadle 97 and releasing arm 96 connected therewith by the rod 98. Depression of the treadle lets the clutch-bolt into engagement with the pulley. When the treadle and arm are at normal position the clutch is automatically released as the shaft completes a revolution.

S indicates a safety chock-device pivoted to the base and adapted to be swung under the treadle when desired, to prevent depression thereof, and the starting of the machine accidentally.

In the operation, the bottle or other article to be labeled is placed upon the rest 6 and the treadle depressed to start the shaft 2. The pickers 15 move up to the label-holder H, their faces being meanwhile supplied with glue by the transfer-roller 45, which swings forward from contact with the glue-delivering-roll 28, and then rolls in contact with the picker faces. The pickers take a single label from each of the packs L and I, and bring them to position near the bottle, where they are gripped centrally against the bottle surface by the grip-devices 60—61, which swing down thereon, as in Fig. 13; taking the label from the pickers as the latter are again elevated. The wipers 73—74 are caused to swing inward over the gripped labels, and are locked by the knuckle-jointed links 8 and slide 81. Then a downward movement of the wiper-carrier 7 carries the wipers past the bottle, thereby wiping the glued ends of the labels firmly down upon the surface of the bottle; after which the bottle is removed, another put in its place and the operation repeated.

The treadle 97 is hinged to ears formed upon the base of the machine frame, as at 99; and is provided with a hinged tail-piece or arm 100, to the end of which the rod 98 is pivoted. This construction permits of the treadle being folded or swung up against the front of the base standard to facilitate sweeping around the base, and for shipment in less space than otherwise.

To guard against any retrovert movement of the pickers, wiper mechanism and grip-devices, when the clutch is released from the drive-pulley, I provide a back-stop comprising a gang or plurality of bars or fingers 103, preferably three, pivoted to the frame and adapted to engage with a suitable longitudinal recess or shoulder formed in or upon one side of the cam-shaft 2. Said fingers are severally made slightly different in length, so that at least one or more of them will surely engage the shoulder at the instant the clutch releases, and thereby hold the shaft, at its stopped position, against any tendency to be rotated backward by the weight or pressure of the working parts resting eccentrically upon the cams, or either of them.

I claim and desire to secure by Letters Patent—

1. In a bottle-labeling machine, in combination, with a bottle-rest, a bottom delivery label-holder, and wiper mechanism; a picker-carrier consisting of a rectangular open-centered frame, vertical guides fixed upon the main frame for guiding the respective edges of said carrier, the swinging lever fulcrumed at its rear end and having a cam-engaging roller, the fore-arm of said lever being laterally offset and connected with said picker-carrier by a flexible joint coupling-device, the operating shaft, and a cam mounted upon said shaft acting against the roller mounted upon said lever, substantially as set forth.

2. In a bottle-labeling machine, the combination with an overhead label-holder, and reciprocating picker-carrier having glue-applying pickers mounted thereon, and the vertically swinging lever for moving said picker-carrier; of the independently supported spring and guide therefor, said spring adapted to receive contact at the latter part of the stroke as the carrier approaches the limit of its elevative movement and to impart a reacting force upon the picker-carrier mechanism when the pickers are in conjunction with the label-holder.

3. In a bottle labeling machine, the combination with the bottle rest, an overhead label-supply holder, a picker-carrier consisting of a vertical sliding frame having an ear, glue-applying pickers horizontally mounted thereon, a lever for actuating said picker carrier, of a yielding connection comprising a hinging member and a link-member in slidable union with each other, and respectively pivoted to the carrier ear and the actuating lever, and a tension spring arranged on a slidable connection, and adapted for yieldably maintaining said connection at its normal working length.

4. In a bottle labeling machine, the combination with the bottle rest, a bottom-delivery label-supply holder, a vertically moving picker-carrier having an ear, horizontal faced glue-applying pickers mounted on said carrier that take labels from said label-holder, and the lever for actuating said picker-carrier; of a yielding coupling device, including a link-bar, a resistance spring, and a pivoting member, coupling said actuating lever to the picker-carrier ear, and a supplemental reacting spring that receives contact from said lever and is put under pressure when the pickers approach the label-holder, for exerting resilient force at the initial downward movement of the picker devices.

5. In combination with the label-holder, glue-applying pickers, reciprocating picker-carrier, and the carrier-actuating lever; of a coupling means connecting said lever and picker-carrier, comprising a wrist-stud, a link-bar passing through said wrist-stud, and a spring arranged upon said link-bar between its flanged end and said wrist-bar, said spring compressible to afford yielding pressure of the pickers against the packs of labels upon the label-holder.

6. In a labeling machine, a label-wiping mechanism comprising, in combination, a reciprocating wiper-carrier, guiding means therefor, a pair of right and left rockable wiper-supporting arms each having a bearing-hub and actuator-connecting ear or projection, axis-studs for said hubs mounted on the wiper-carrier, a movable piece supported upon the wiper-carrier, a pair of link-bars pivotally connecting the ears of the respective wiper-arms to said movable piece, means for reciprocating the wiper-carrier, and means for changing the relative position of said movable piece on the wiper-carrier during the operation of the latter, for the purpose set forth.

7. In a labeling machine, a wiper mechanism including a pair of forwardly extending laterally-rockable wiper-arms each comprising a wiper-supporting member and bearing hub, a reciprocating wiper-carrier provided with axis-studs upon which said wiper-arms are respectively supported, a slide-piece mounted upon the wiper-carrier to have reciprocative movement therewith and independent endwise movement thereon, means operatively connecting said slide-piece with the respective wiper-arms to effect rocking action thereof, means for reciprocating the wiper-carrier, and means for independently operating said slide piece.

8. In a labeling machine, in combination with a bottle-rest, and means for gluing, presenting and gripping a label, a wiper mechanism comprising the central upright guide, a reciprocating wiper-carrier movable on the guide and having a roller-stud upon its side, a pair of wiper-arms rockably supported on axes in connection with said wiper-carrier, wipers mounted on said wiper-arms, an endwise movable slide-bar mounted upon said wiper-carrier, pivotally attached links connecting said slide-bar with a projecting ear on each wiper-arm, an operating shaft, a dual cam mounted thereon, one portion of said cam acting against the roller-stud of the wiper-carrier, the other portion actuating a connecting means for moving said slide-bar, for controlling the action of the wipers.

9. In a labeling machine, in combination with a bottle-supporting member and means for gluing, presenting and gripping the labels, a reciprocating wiper-carrier and a guide therefor; the oppositely rockable wiper-arms having their axial support upon and moving with said carrier, a reciprocating slide mounted upon the wiper-carrier, means in connection with said slide for rocking said wiper-arms, swinging neck-wipers hingingly supported on said wiper-arms, an actuating means for reciprocating the wiper-carrier, means for independently moving said slide upon the wiper-carrier to rock the wiper-arms, and means for independently controlling the swing movement of the neck-wipers.

10. In a labeling machine wiper-mechanism, the combination of the upright guide, an operating shaft, a wiper-carrier movable on said guide, and provided with a roller-stud, a pair of rockable wiper-arms comprising wiper-supporting members and bearing hubs having projecting ears thereon, axles fixed in said wiper-carrier whereon said wiper-arms are supported, a slide-bar mounted upon said carrier, knuckle-joint links connecting said slide-bar with the ears of the respective wiper-arms, a cam mounted on said operating shaft and directly acting against the roller-stud of the wiper-carrier, a second cam, a lever actuated thereby and a connecting-rod controlling said slide, and a counter spring connected with said rod, for the purpose set forth.

11. In a bottle-labeling machine, in combination with means for delivering and affixing labels, a glue-box or supply reservoir, a glue-delivering roll mounted therein, and a glue-transferring roller that moves into conjunction therewith; of an underlying cradle forming a seat upon which said glue-box is supported, and means for adjusting said cradle in relation to the main supporting frame, for the purpose set forth.

12. In a labeling machine, the combination, with mechanism for presenting and affixing labels to bottles or the like; of a box-supporter or cradle hingedly connected at its rear corners with its supporting frame, and having adjusting means for elevating or depressing its front edge, a bar horizontally pivoted within said cradle and having engageable end portions, and means for adjusting the horizontality of said bar, and the removable glue-box containing the glue-delivering roll, said glue-box provided with recessed lugs that engage the respective end portions of said bar, and lugs that engage the lip of said cradle, for the purpose set forth.

13. In a bottle labeling machine, in combination, with mechanism for delivering and affixing labels, including glue-applying label-feeding pickers, the glue-supply box or reservoir having the glue-delivering roll mounted therein, and a glue-transferring roller carried by swinging arms and movable to said pickers from said delivering roll; of a supporting-cradle, or box-seating device consisting of a frame adjustably connected with the main supporting frame, means for the up and down adjustment of the cradle, a horizontal centrally pivoted bar arranged therein, the ends thereof adapted for engaging lugs upon the exterior of the glue-box, and an adjusting screw for regulating said bar; said glue-box being provided with lugs whereby it is detachably supported upon said cradle.

14. In a labeling machine of the character described, in combination with the bottle-rest, and a grip-device having a rocking axial support, a grip-actuating means including a compressible connection of limited maximum length, and an expanding spring therefor of sufficient tension to keep the connection normally extended for moving the grip-device toward the bottle-rest with a positive action and final yielding pressure, and a retracting spring for moving the grip-device from the bottle when the actuator-connection is relieved.

15. In a labeling machine, in combination with the bottle-rest, swinging grip-device, its fulcrum-axle, an operating cam, and a cam-operated lever or member; the grip-actuating connection comprising end coupling-heads respectively pivoted to said lever and an arm on the grip-fulcrum-axis, a link-rod joining and slidable in said coupling-head and limitingly confined by nuts or bosses upon its ends, and an expanding coil spring mounted on said link-rod between the coupling-heads, and exerting outward pressure thereon sufficient to keep the connection normally extended but yielding as the grip-device descends against the work.

16. In a bottle labeling machine, the main frame comprising a base stand and a substantially rectangular body portion including a flat top, and having, at its front, right and left upright picker-carrier-guides, a central upright guide-rod extending above said body, a label-holder-carrier mounted on the upper part of said rod, means for supporting a label-holder upon said carrier, a back-stay brace having its foot rigidly attached to the body-frame and its upper end embracing said rod above the label-holder-carrier, and provided with a bifurcated arm that retains the label-holder-carrier against lateral displacement.

17. In a labeling machine, the combination, with the frame, the vertical guide-rod and the label-holder; of a label-holder-carrier mounted on said guide-rod and having a parallel faced member, a sustaining-brace for the upper end of said guide-rod, said brace provided with an arm having a bifurcated end that embraces said parallel-faced member laterally, adjusting-screws threaded in said arm and impinging against the opposite parallel faces of said member, and means for moving the label-holder-carrier to a limited extent up and down while its lateral movement is prevented by said arm.

18. In a labeling machine, the combination with mechanisms for gluing, presenting and affixing labels, cams for actuating said mechanisms, an operating shaft carrying said cams having a longitudinal shoulder at a predetermined position thereon, and an automatic-stop clutch for clutching and releasing the driving power with said shaft, of a back-stop means coacting with said shoulder for preventing reverse action of the cam shaft, when the clutch is released.

19. In a labeling machine for bottles and the like, in combination with a work-supporting rest, and means for gluing and presenting labels; a pair of individually fulcrumed laterally oscillating right and left wiper-supporting elements having projecting members, link-devices pivoted thereto for insuring positive uniform right and left lateral action of the pair, a reciprocating carrier upon which said wiper-supporting elements are pivotally mounted, means for reciprocating said carrier to move the wipers past the bottle, and coacting means for simultaneously imparting a differential reciprocative movement for effecting oscillation of said wiper-supporting elements laterally.

20. In a machine for affixing labels, the combination with means for gluing and presenting labels; of a main wiper-carrier or slide having approximately vertical movement, right and left rockable wiper-supporting members carried thereon, a secondary slide mounted on said main wiper-carrier, connecting means joining said secondary slide and the wiper-supporting members for moving the same laterally, means for imparting movement to said main wiper-carrier to carry the wipers past the position of the applied label, and means for differentially actuating said secondary slide upon and in respect to the main wiper-carrier.

21. In a labeling machine for bottles and the like, a wiper-mechanism including, in combination, a main slide or wiper-carrier, a pair of individually fulcrumed oscillating wiper-supporting elements pivotally mounted thereon, a secondary slide or member mounted to move in approximately the same direction as said main slide or carrier, pivotally attached link-connections for imparting oscillative movement to and maintaining uniformity of opposite lateral swing of the respective wiper-supporting elements, swinging neck-wiper appliances pivotally mounted upon said oscillating wiper-supporting elements, retracting springs for said neck-wiper appliances, means for operating the main slide or carrier up and down, and an actuating means for imparting simultaneous and additional movement to said secondary member in relation to the main slide or carrier movement, for swinging the wiper-supporting elements outward at the lower limit and inward at the upper limit of the wiper action, and counter engaging contact-devices and cam-surfaces for controlling said neck-wiper appliances supplementary to the action imparted by the main wiper-carrier and oscillating movement of the wiper-supporting elements.

Witness my hand this 2nd day of November, 1908.

FRANK O. WOODLAND.

Witnesses:
CHAS. H. BURLEIGH,
A. G. DAVIS.